United States Patent
Gottzmann et al.

[11] Patent Number: 6,139,810
[45] Date of Patent: Oct. 31, 2000

[54] TUBE AND SHELL REACTOR WITH OXYGEN SELECTIVE ION TRANSPORT CERAMIC REACTION TUBES

[75] Inventors: Christian Friedrich Gottzmann, Clarence; Ravi Prasad, East Amherst; Joseph Michael Schwartz, Amherst; Victor Emmanuel Bergsten, East Amherst; James Eric White, Amherst, all of N.Y.; Terry J. Mazanec, Solon, Ohio; Thomas L. Cable, Newbury, Ohio; John C. Fagley, Sagamore Hills, Ohio

[73] Assignees: Praxair Technology, Inc.; The Standard Oil Company, both of Danbury, Conn.

[21] Appl. No.: 09/089,372

[22] Filed: Jun. 3, 1998

[51] Int. Cl.[7] .................................. B01D 52/22; B01J 8/00
[52] U.S. Cl. ........................ 422/197; 422/201; 422/205; 422/240; 422/211; 422/239; 96/8
[58] Field of Search ..................................... 422/197, 201, 422/205, 240, 241, 312, 211, 239; 96/8, 10

[56] References Cited

U.S. PATENT DOCUMENTS

| | | | |
|---|---|---|---|
| 2,380,391 | 7/1945 | Bates | 208/146 |
| 3,901,669 | 8/1975 | Seitzer | 423/648.1 |
| 4,120,663 | 10/1978 | Fally | 422/198 |
| 4,590,044 | 5/1986 | Mos et al. | 422/191 |
| 4,793,904 | 12/1988 | Mazanec et al. | 205/334 |
| 5,082,751 | 1/1992 | Reichner | 429/19 |
| 5,108,465 | 4/1992 | Bauer et al. | 95/24 |
| 5,112,578 | 5/1992 | Murayama et al. | 422/197 |
| 5,143,800 | 9/1992 | George et al. | 429/20 |
| 5,306,411 | 4/1994 | Mazanec et al. | 204/265 |
| 5,356,728 | 10/1994 | Balachandran et al. | 429/8 |
| 5,552,039 | 9/1996 | McBrayer, Jr. et al. | 210/90 |
| 5,565,009 | 10/1996 | Ruhl et al. | 48/197 R |
| 5,567,398 | 10/1996 | Ruhl et al. | 422/197 |
| 5,599,383 | 2/1997 | Dyer et al. | 96/8 |
| 5,611,931 | 3/1997 | Liu et al. | 210/653 |
| 5,681,373 | 10/1997 | Taylor et al. | 96/11 |
| 5,702,999 | 12/1997 | Mazanec et al. | 501/152 |
| 5,712,220 | 1/1998 | Carolan et al. | 502/400 |
| 5,733,435 | 3/1998 | Prasad et al. | 205/765 |
| 5,750,279 | 5/1998 | Carolan et al. | 429/32 |
| 5,820,654 | 10/1998 | Gottzmann et al. | 95/54 |
| 5,820,655 | 10/1998 | Gottzmann et al. | 95/54 |
| 5,846,641 | 12/1998 | Abeles et al. | 428/312.8 |
| 5,935,533 | 8/1999 | Kleefisch et al. | 422/211 |

FOREIGN PATENT DOCUMENTS 1242401  3/1988  Japan.

*Primary Examiner*—Marian C. Knode
*Assistant Examiner*—Susan Ohorodnik
*Attorney, Agent, or Firm*—David M. Rosenblum

[57] ABSTRACT

A reactor comprising: a hollow shell defining a hermetic enclosure; a plurality of tube sheets disposed within said hermetic enclosure, a first one of said plurality of tube sheets defining a first chamber; at least one reaction tube each having a first end and an opposing second end, said first end being fixedly attached and substantially hermetically sealed to one end of said plurality of tube sheets and opening into said first chamber, the second end being axially unrestrained; each of said reaction tubes is comprised of an oxygen selective ion transport membrane with an anode side wherein said oxygen selective ion transport membrane is formed from a mixed conductor metal oxide that is effective for the transport of elemental oxygen at elevated temperatures and at least a portion of said first and second heat transfer sections are formed of metal; each of said reaction tubes includes first and second heat transfer sections and a reaction section, said reaction section disposed between said first and second heat transfer sections; a reforming catalyst disposed about said anode side of said oxygen selective ion transport membrane; a first process gas inlet; a second process gas inlet; and, a plurality of outlets.

18 Claims, 10 Drawing Sheets

TUBE AND SHELL REACTOR WITH OXYGEN SELECTIVE ION TRANSPORT CERAMIC REACTION TUBES

FIELD OF THE INVENTION

The invention relates to a process for producing a product gas, such as syngas or an unsaturated hydrocarbon, utilizing a combination of an exothermic partial oxidation reaction and an endothermic steam reforming reaction. More particularly, the oxygen for the exothermic reaction is received by transport through an oxygen selective ion transport membrane element, and the heat generated by the exothermic reaction is supplied to the endothermic reaction.

BACKGROUND OF THE INVENTION

Natural gas and methane, a major constituent of natural gas, are difficult to economically transport and are not easily converted into liquid fuels, such as methanol, formaldehyde and olefins, that are more readily contained and transported. To facilitate transport, methane is typically converted to synthesis gas (syngas) which is an intermediate in the conversion of methane to liquid fuels. Syngas is a mixture of hydrogen and carbon monoxide with $H_2/CO$ molar ratio from about 0.6 to about 6.

One method to convert methane to syngas is steam reforming. The methane is reacted with steam and endothermically converted to a mixture of hydrogen and carbon monoxide. The heat sustaining this endothermic reaction is provided by external combustion of fuel. The steam reforming reaction is of the form:

$$CH_4 + H_2O \rightarrow 3H_2 + CO. \quad (1)$$

In a partial oxidation reaction, methane is reacted with oxygen and converted to syngas in an exothermic reaction. The partial oxidation reaction is of the form:

$$CH_4 + \tfrac{1}{2}O_2 \longrightarrow 2H_2 + CO \quad (2)$$

Both the steam reforming reaction and the partial oxidation reaction are expensive to maintain. In steam reforming, a significant quantity of fuel is required to provide the heat to sustain the endothermic reaction. In the partial oxidation reaction, significant energy and capital must be expended to provide the oxygen required to drive the reaction.

U.S. Pat. No. 5,306,411 to Mazanec et al., which is incorporated by reference in its entirety herein, discloses the production of syngas by partial oxidation and steam reforming where the oxygen is obtained by transport through an oxygen selective ion transport membrane element and both reactions take place on the anode or permeate side of the membrane. This membrane element conducts oxygen ions with infinite selectivity and is disposed between an oxygen-containing feed stream, typically air, and an oxygen consuming, typically methane-containing, product or purge stream.

"Oxygen selectivity" is intended to convey that the oxygen ions are preferentially transported across the membrane over other elements, and ions thereof. The membrane element is made from an inorganic oxide, typified by calcium- or yttrium-stabilized zirconia or analogous oxides having a fluorite or perovskite structure.

At elevated temperatures, generally in excess of 400° C., the membrane elements contain mobile oxygen ion vacancies that provide conduction sites for the selective transport of oxygen ions through the membrane elements. The transport through the membrane elements is driven by the ratio of partial pressure of oxygen ($P_{O_2}$) across the membrane: $O^{--}$ ions flow from the side with high $P_{O_2}$ to the side with low $P_{O_2}$.

Ionization of $O_2$ to $O^{--}$ takes place on the cathode side of the membrane element and the ions are then transported across the membrane element. The $O^{--}$ ions then combine to form oxygen molecules or react with fuel while releasing $e^-$ electrons. For membrane elements that exhibit only ionic conductivity, external electrodes are placed on the surfaces of the membrane element and the electron current is returned by an external circuit. If the membrane has ionic as well as electron conductivity electrons are transported to the cathode side internally, thus completing a circuit and obviating the need for external electrodes.

The Mazanec et al. '411 patent discloses contacting an oxygen-containing gas with the cathode side of an oxygen selective transport membrane element. A stream of process gases, such as methane and steam, flows along the anode side of the membrane element. Transported oxygen reacts exothermically with the methane in a partial oxidation reaction forming carbon monoxide and hydrogen. At the same time the heat released by the partial oxidation reaction enables methane and steam to engage in an endothermic reaction to produce additional hydrogen and carbon monoxide. Typically a reforming catalyst is provided to promote this reaction. The syngas can then be converted to methanol or to other liquid fuels by the Fischer-Tropsch process or other chemicals in subsequent processes.

While the Mazanec et al. '411 patent discloses that a portion of the heat generated by the exothermic partial oxidation reaction may be utilized to maintain the temperature of the ion transport membrane element, no provisions are made for the removal of excess heat from the reactor. Further, while the partial oxidation and steam reforming reactions are best conducted at high pressure, there is no disclosure in Mazanec et al. of a reactor design or sealing configuration to support high pressures.

Commonly owned U.S. patent application Ser. No. 08/848,204 now U.S. Pat. No. 5,820,655 entitled "Solid Electrolyte Ion Conductor Reactor Design" by Gottzmann et al. that was filed on Apr. 29, 1997 and is incorporated by reference in its entirety herein, discloses using the heat generated by an exothermic partial oxidation reaction to heat an oxygen-containing feed gas prior to delivery of that feed gas to the cathode side of an oxygen selective oxygen transport membrane element. The Ser. No. 08/848,204 application also discloses the use of a thermally conductive shroud tube surrounding the membrane elements to enhance the conduction of heat while maintaining isolation of gases. Reactive purge arrangements are disclosed in "Reactive Purge for Solid Electrolyte Membrane Gas Separation", U.S. Ser. No. 08/567,699, filed Dec. 5, 1995, E.P. Publ. No. 778,069, and also incorporated herein by reference. Both applications are commonly owned with the present application.

U.S. Pat. Nos. 5,565,009 and 5,567,398 to Ruhl et. al., that are incorporated by reference in their entirety herein, disclose manufacturing syngas by steam reforming of methane in a catalyst bed located on the shell side of a tube and shell reactor. The heat for sustaining the reforming reaction is provided by combustion of fuel within tubes where the fuel and oxygen supply (air) are separately heated and only combined after they reach their autoignition temperature. The flow paths of the reactor disclosed by Ruhl et al. are arranged such a way that the combustion products as well as the endothermic reaction products are cooled before exiting the furnace. The disclosed design allows for the use of lower temperature seals where the combustion tubes are joined to tube sheets.

There remains, however, a need for a reactor for the production of syngas and unsaturated hydrocarbons that utilizes an oxygen-selective ion transport membrane element, is capable of operating at pressures above 150 psig and temperatures in the range of 800° C. to 1100° C., and has provisions that compensate for dimensional changes in the membrane elements due to thermal heating and due to the uptake and release of oxygen by the membrane elements during operational and transitional periods. The reactor should, in addition, maintain the membrane elements within prescribed temperature limits by careful balance of the heats of reaction and other heat sinks or sources as well as effective transfer of heat from exothermic reactions to endothermic reactions and other heat sinks. It should also increase safety by minimizing the risk of a high-pressure leak of a flammable process or product gas into oxygen containing streams.

OBJECTS OF THE INVENTION

It is therefore an object of the invention to provide a process for producing syngas by a process that utilizes both an exothermic reaction and an endothermic reaction wherein the reactions either are balanced or are tailored to generate a slight heat surplus.

A further object of the invention is to control the exothermic reaction and the endothermic reaction by controlling the flow rate, composition and/or pressure of the gases provided to the respective reactions. Such gases include an oxygen-containing feed gas, fuel gases, and steam or carbon dioxide. Further control of the endothermic reaction preferably is achieved by control of localized catalyst activity as well as local control of process gas composition.

Yet another object of the invention is to enable independent control of the exothermic and endothermic reactions by selectively incorporating thermally conductive shroud tubes which separate the reactions while permitting efficient transfer of heat between reactions within the reactor.

A still further object of the invention is to minimize the temperatures experienced by seals as well as to minimize pressures differences for tube-to-tube sheet seals that isolate fuel-containing spaces within the reactor interior. This is accomplished in one embodiment by using a two-stage seal and disposing a buffer gas such as steam at a pressure slightly higher than the process side pressure between the two seals. Thus any leakage through the first stage seal will be steam into the process side and through the second stage seal will be steam into an oxygen containing gas.

SUMMARY OF THE INVENTION

In one aspect, this invention comprises a process for producing a product gas in a reactor that contains at least one oxygen selective ion transport membrane element. The oxygen selective ion transport membrane element has a cathode side and an anode side. The process includes the steps of:

(1) flowing in a first direction an oxygen containing gas along the cathode side and transporting a permeate oxygen portion through the oxygen selective ion transport membrane element to the anode side;

(2) isolating both a first process gas and a second process gas from the oxygen containing gas whereby at least the first process gas flows along the anode side and the first process gas is capable of both an exothermic reaction with oxygen and an endothermic reaction with the second process gas;

(3) exothermically reacting the oxygen portion with the first process gas and endothermically reacting the first process gas with the second process gas; and (4) controlling at least one of the exothermic reaction, the endothermic reaction, and internal heat transfer within the reactor to maintain the oxygen selective ion transport membrane within prescribed thermal limits.

In a preferred embodiment of the first aspect, the exothermic reaction is a partial oxidation reaction and the endothermic reaction is a steam reforming reaction. The oxygen containing gas is air, the first process gas is a light hydrocarbon such as methane or a mixture of light hydrocarbons, hydrogen, and carbon monoxide and the second process gas is either steam or a mixture of steam and carbon dioxide. The first process gas and the second process gas are combined to form a gaseous mixture prior to the exothermic and endothermic reactions.

In another preferred embodiment at least a portion of the anode side of the membrane element is coated with a catalyst layer to accelerate the oxidation reaction between oxygen and a fuel gas at the anode. A catalyst bed is positioned along at least a portion of the anode side of the oxygen selective ion transport membrane. This catalyst is selected to be capable of promoting the endothermic reaction between steam, carbon dioxide and fuel gas. In an alternative preferred embodiment, the second process gas is separated from said first process gas by a thermally conductive, gas impervious member. The first process gas flows through an oxidation passageway and exothermically reacts with permeate oxygen while the second process gas and additional first process gas flow through a reforming passageway.

Preferably, the reforming passageway is packed with a catalyst capable of promoting the endothermic reaction. The local activity of the catalyst bed is selectively tailored to produce a positive balance between the exothermic and endothermic reaction temperatures about a peripheral portion of the bed and a neutral balance in the center of the bed. More preferably, the catalyst activity gradually increases toward the middle and exit end of the bed at a decreasing rate.

In a second aspect of the invention, the process is utilized for producing a mixture of hydrogen and carbon monoxide (syngas) in a reactor that contains at least one oxygen selective ion transport membrane element. This oxygen selective ion transport membrane element has a cathode side and an anode side. In this second aspect, the said process includes the steps of:

(1) flowing air in a first direction along the cathode side and transporting a permeate oxygen portion through the oxygen selective ion transport membrane element to the anode side;

(2) flowing a gaseous mixture of light hydrocarbons such as methane and steam along the anode side;

(3) exothermically reacting a first portion of the hydrocarbon with permeate oxygen while endothermically reacting a second portion of the hydrocarbon with the steam; and (4) controlling at least one of the exothermic reaction, the endothermic reaction and internal heat transfer within the reactor to maintain the oxygen selective ion transport membrane at a temperature within prescribed limits.

In a preferred embodiment of this process, the steam is delivered to the reactor at a higher pressure than the methane is delivered to the reactor. By proper positioning of steam and methane inlets, the steam functions as a buffer, to prevent the leaking of flammable methane from the reactor and into oxygen containing spaces within the reactor. Typically, the steam is delivered to the reactor at a pressure that is from 1 to 20 psig greater than the pressure at which the methane is delivered to the reactor.

In a third aspect of the invention, there is provided a reactor that has a hollow shell defining a hermetic enclosure. A first tube sheet is disposed within the hermetic enclosure and defines a first chamber and a second chamber. Within the hermetic enclosure is at least one reaction tube. The reaction tube has a first portion that is fixedly attached and substantially hermetically sealed to the first tube sheet and opens into said first chamber, the remaining portion being axially unrestrained and an oxygen selective ion transport membrane disposed between the first end and the second end of the reaction tube.

In addition, the reactor includes a first process gas inlet for the delivery of a first process gas to the hermetic enclosure at a first pressure, a second process gas inlet for delivery of a second process gas to the hermetic enclosure at a second pressure, an air inlet for delivery of an oxygen containing gas to the hermetic enclosure at a third pressure and a plurality of outlets for the removal of a product gas and reaction by-product gases from the hermetic enclosure.

In a preferred embodiment, the reaction section of the reactor is effective for the selective transport of oxygen from an inside cathode surface thereof to an outside anode surface thereof and an oxidation enhancing catalyst is selectively disposed on the outside surface and a reforming catalyst about the outer surface. The reactor includes at least one sliding seal that engages said reaction tube. The second end of the reaction tube is attached to a floating tube sheet which is part of an internal manifold which is connected to said shell by flexible bellows or by a stuffing box type seal. Alternatively, individual tubes are joined to the floating tube sheet by short flexible bellows.

In another preferred embodiment, the first end of the reaction tube first end is open proximate the first tube sheet and the second end is closed. A feed tube extends within the reaction tube from the open end to a spaced distance from the closed end whereby an outside surface of the feed tube and an inside surface of the reaction tube define a first annulus. Typically, the first annulus has a width that is less than one-half the inside diameter of the feed tube.

In another preferred embodiment, a thermally conductive shroud tube is disposed about an outside surface of the reaction tube and a combination of an inside surface of the shroud tube and an outside surface of the reaction tube define a second annulus. A combination of the thermally conductive shroud and the reaction section define an oxidation passageway and a reforming passageway is disposed on an opposing side of the thermally conductive shroud. This reforming passageway may be packed with a catalyst that is effective in promoting an endothermic steam reforming reaction.

In still another alternative embodiment, the reactor includes a second reaction tube that extends through the hermetic enclosure in generally parallel alignment with the first reaction tube. This second reaction tube also has a first end attached to the first tube sheet and fixed relative to the shell, an opposing second end that is moveable relative to the shell and a second reaction section disposed between the first and second ends. The second reaction tube is open at the first end and closed at the opposing second end. A second feed tube is disposed within the second reaction tube. An outside surface of the second feed tube and an inside surface of the reaction tube define a third annulus.

In a preferred embodiment, the first reaction tube includes an oxygen selective ion transport membrane effective for the selective transport of oxygen from an outer cathode side to an inner anode side and the second reaction tube contains a reforming catalyst. In still another preferred embodiment, the second process gas inlet is disposed between the first tube sheet and the first process gas inlet for delivery of a second process gas selected from the group consisting of carbon dioxide, steam and mixtures thereof to said hermetic enclosure at a second pressure that is greater than the first pressure. A flow restrictor may be disposed between said second process gas inlet and said first process gas inlet.

BRIEF DESCRIPTION OF THE DRAWINGS

Other objects, features and advantages will occur to those skilled in the art from the following description of preferred embodiments and accompanying drawings, in which.

DETAILED DESCRIPTION OF THE INVENTION

This invention may be accomplished by providing an oxygen selective ion transport membrane element that transports oxygen from an oxygen-containing gas through the membrane element. The oxygen exothermically reacts with a first process gas in an exothermic partial oxidation reaction. Heat generated by the exothermic reaction is supplied to an endothermic reaction such as a steam reforming reaction.

In preferred embodiments, the process gas is natural gas, methane, or a similar light hydrocarbon, or a mixture of light hydrocarbons, hydrogen and carbon monoxide, and both the partial oxidation reaction and the steam reforming reaction produce syngas. The exothermic reaction and the endothermic reaction either are balanced or are adjusted to provide for a slight heat surplus. To ease the sealing duty of the reactor seals, a relatively low temperature buffer gas preferably is disposed between the reactor seals and the process and the product gases. The buffer gas is a relatively non-hazardous constituent of the reactions, such as steam or carbon dioxide.

Figure 1:
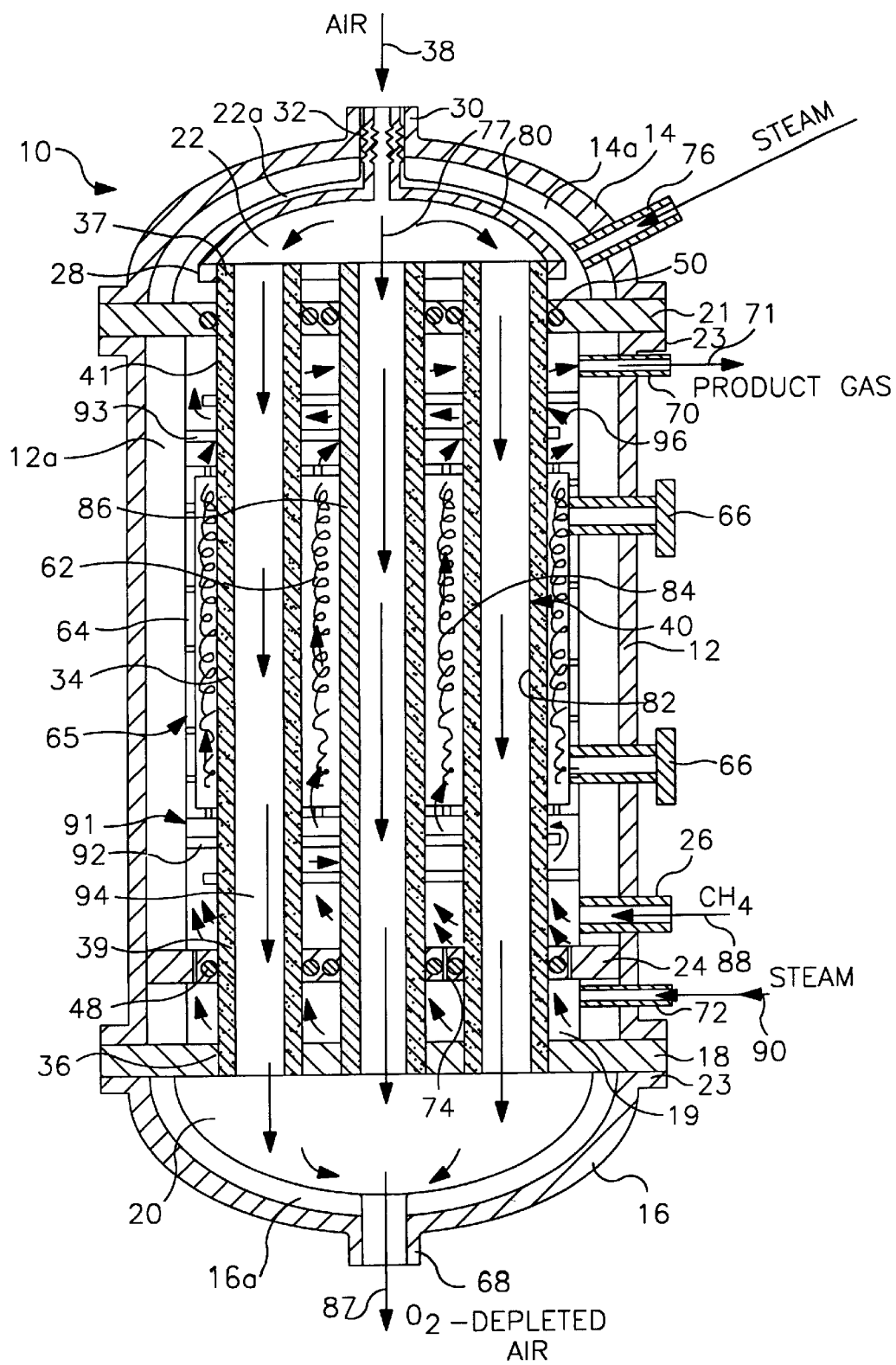
FIG. 1. illustrates in cross-sectional representation a reactor in accordance with a first embodiment of the invention.

FIG. 1 illustrates in cross-sectional representation a reactor 10 for producing a product gas in accordance with a first embodiment of the invention. While typically the product gas is syngas, other product gases, such as unsaturated hydrocarbons, may also be produced by the processes and reactors described below. The invention is equally applicable to any other process that involves an exothermic oxidation reaction requiring oxygen and an endothermic reaction such as oxidative dehydrogenation of methane and other light hydrocarbons to unsaturated hydrocarbons.

While the reactor 10 is illustrated as a tube and shell type reactor, other reactors as known in the art are also amenable to the process of the invention. The reactor 10 has a cylindrical body 12 that is thermally isolated from the high temperature interior of the reactor by insulation 12a and therefore can be formed from ordinary materials of construction such as steel and stainless steel. A first end cap or head 14 and a second end cap or head 16 are hermetically sealed to the body 12 to define a hollow enclosure and preferably also are thermally isolated by insulation 14a and 16a. A first tube sheet 18 is disposed within the hermetic enclosure and defines a first chamber 19 and a second chamber 20.

A second tube sheet 21 may be disposed at a second end of the hermetic enclosure to define a third chamber 22a. Both the first tube sheet 18 and the second tube sheet 21 are attached to the reactor 10, such as by welding to shell 12, heads 14 and 16, or bolting to flanges 23.

A first flow-restricting tube sheet or baffle 24 is fixedly attached to the reactor 10 such as by welding. The first flow restricting tube sheet 24 is disposed between the first tube sheet 18 and a first process gas inlet 26.

A floating tube sheet 28 is disposed above the second tube sheet 21 within space 22a and has head or cap 80 attached to it to form manifold space 22 connected to oxygen-containing gas inlet 30. The floating tube sheet 28 is moveable relative to the reactor shell 12 by virtue of bellows attachment 32 sealably inter-connecting head 14 to head 80. Alternately a sliding seal of the stuffing box type can be employed between an inlet pipe, connected to head 80, and inlet 30 in a manner similar to the slidable sealing of tube 34 to tube sheet 21 and sleeve 52 in FIG. 3, described below.

At least one reaction tube 34 extends axially through the second chamber 20. A first end 36 of the reaction tube 34 is fixedly attached and hermetically sealed to the first tube sheet 18. As a result, gas flow between the second chamber 20 and first chamber 19 is through the reaction tube 34 bore only.

Figure 5:
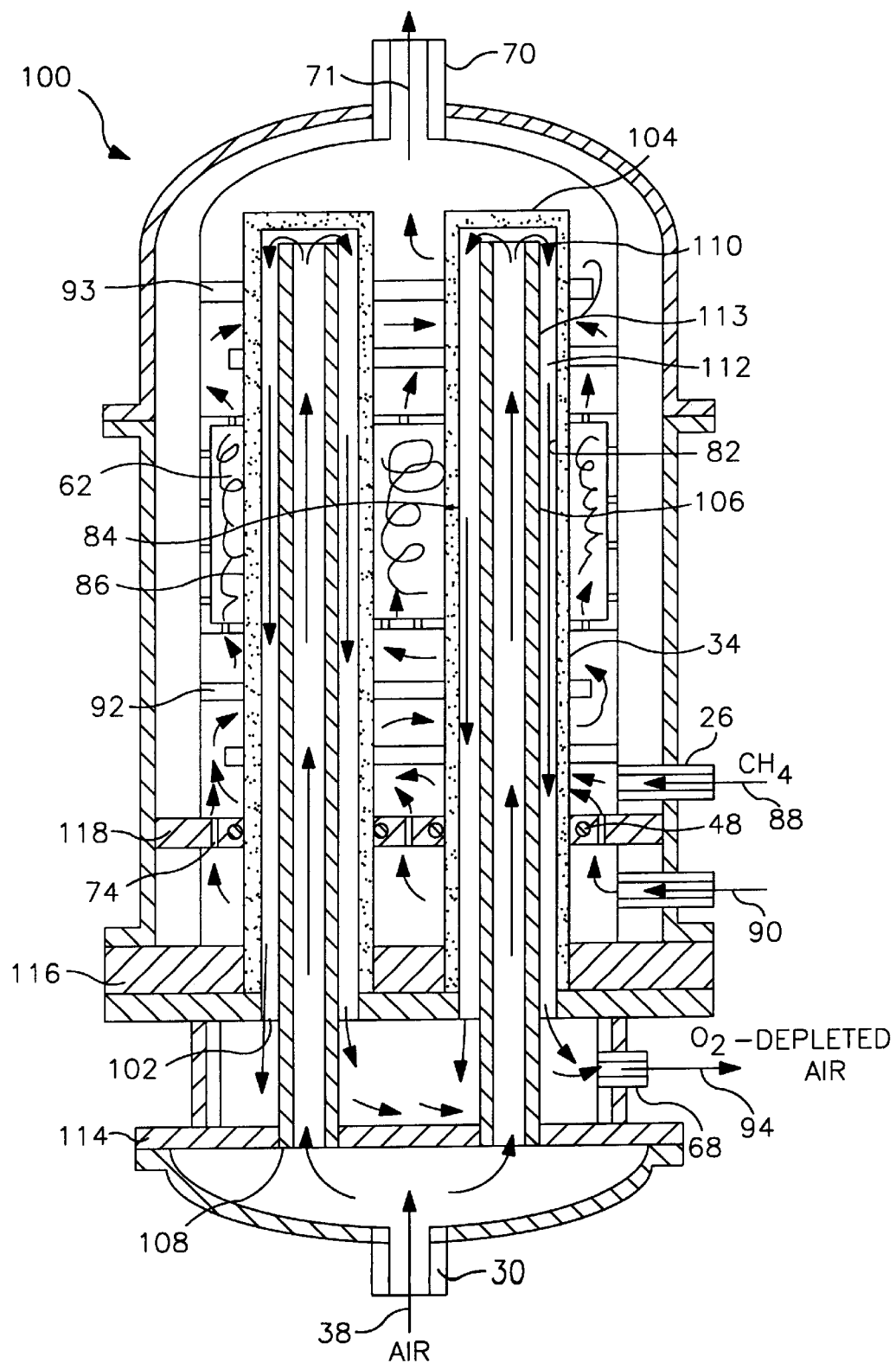
FIG. 5 illustrates in cross-sectional representation a reactor in accordance with a second embodiment of the invention.

An opposing second end 37 of the reaction tube is axially unrestrained. The second end 37 may be free-floating as best illustrated in FIG. 5, or attached and sealed to the floating tube sheet 28, FIG. 1. Optionally, relatively short bellows can be used to connect the second end 37 to tube sheet 28 to allow for slight differences in individual tube expansions such as shown in FIG. 1A of U.S. Pat. No. 5,567,398 by Ruhl et al. The flexible bellows 32 is integral with the floating tube sheet 28 and head 80 forming a manifold to direct an oxygen-containing gas, such as air, pure oxygen, or any other gas stream containing more than one percent, by volume, of oxygen, to a plurality of reaction tubes 34.

The reaction tubes 34 further contain at least a first heat transfer section 39, and preferably also include a second heat transfer section 41. The reaction tubes 34 further include an oxygen selective ion transport membrane element 40. The oxygen selective ion transport membrane element 40 may be formed as either a dense wall solid oxide mixed or dual phase conductor or, preferably, as a thin film solid oxide mixed or dual phase conductor that is supported on a porous substrate.

Preferentially the membrane film only spans the reaction zone and a minor portion of the heat transfer zones with the remaining length of the porous support being coated with a metallic gas impervious seal coat such as nickel. The porous substrate is preferentially made from a high temperature nickel-containing metal alloy such as Inconel 200 or Haynes alloy 230 or a higher strength ceramic material such as alumina, ceria or a mixture thereof with an intermediate porous layer between the thin film membrane and the porous substrate to bridge chemical and mechanical incompatibility between substrate and membrane. Use of a dense mixed conducting layer on an intermediate porous transition layer over a porous support is disclosed for example in U.S. Pat. No. 5,240,480 by Thorogood et al. Preferentially the dense film is on cathode side of the membrane film.

Composite tubes are preferred since the thin membrane film permits higher oxygen fluxes, the tube can have higher reliability because the thin film membrane is less sensitive to transient compositional stresses transients, and composite tubes use less of the costly membrane material than do dense tubes. The porous support on the process side also eases the stability problem created by the low partial oxygen pressure on the anode side since the diffusional resistance of the porous support to gas transport will tend to increase the oxygen partial pressure at membrane support interface.

The oxygen selective ion transport membrane element has a nominal thickness of under 5000 microns and is preferably less than 1000 microns thick and for the composite embodiment less than 100 microns. The membrane element has the ability to transport oxygen ions and electrons at the prevailing oxygen partial pressure in the temperature range from 450° C. to about 1200° C. when a chemical potential difference is maintained across the ion transport membrane surface caused by maintaining a positive ratio of oxygen partial pressures across the ion transport membrane. This positive ratio is preferably achieved by reacting transported oxygen with an oxygen-consuming process gas. The oxygen ion conductivity is typically in the range of between 0.01 and 100 S/CM where S ("Siemens") is reciprocal ohms $(1/\Omega)$.

Suitable materials for the ion transport membrane include mixed conductor perovskites and dual phase metal-metal oxide combinations as disclosed in U.S. Pat. Nos. 5,702,959 (Mazanec et al.), 5,712,220 (Carolan et al.) and 5,733,435 (Prasad et al.), all of which are incorporated herein by reference. Since the reactive environment on the anode side of the oxygen-selective ion transport membrane typically creates very low partial oxygen pressures, the chromium-containing perovskites listed in the cited patents may be preferred materials since these tend to be stable in the low partial oxygen pressure environment. The chromium-containing perovskites are not typically decomposed at very low partial oxygen pressures.

Optionally, a thin porous catalyst layer, possibly made from the same perovskite material, may be added to one or both sides of the oxygen-transport membrane element to enhance oxygen surface exchange and the chemical reactions on the surfaces. Alternatively, the surface layers of the oxygen-selective ion transport membrane element may be doped, for example, with cobalt, to enhance surface exchange kinetics.

Figure 2:
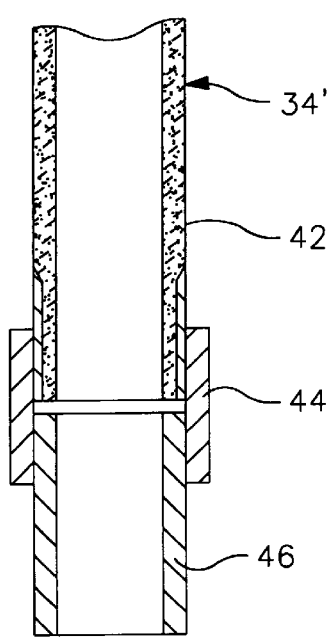
FIG. 2. illustrates in cross-sectional representation a composite reaction tube for use with the reactors of the invention.

The first end 36 of the reaction tube 34 is fixedly attached to the first tube sheet 18. Any method of attachment that is compatible with the tube material in the seal area and provides a rigid, hermetic, seal may be utilized. In a preferred arrangement as illustrated in FIG. 2, a first end 42 of a ceramic reaction tube 34 may be metallized and attached to a metallic sleeve 44 by brazing which in turn is attached to a metallic tube extension 46, also by brazing, and where the metallic extension is attached and sealed to the tube sheet 18 by expansion (rolling in) or welding. A suitable metallized coatings would comprise nickel less than 50 microns thick. A suitable material for the metallic tube extension 46 is Incalloy 200 or Haynes Alloy 230. The tube assembly is typically brazed at a temperature of about 1000 Deg. C. In a preferred approach the metallic extensions span the major portions of heat transfer sections 39 and 41 up to where local temperatures reach a value of about 700 to 800 Deg. C to exploit the better heat transfer characteristics and lower cost of metals. This type of metallic sleeve 44 is disclosed in commonly owned United States patent application Ser. No. 08/848,199 now U.S. Pat. No. 5,820,654 entitled "Integrated solid electrolyte ionic conductor separator-cooler" by Gottzmann et al. that was filed on Apr. 29, 1997 and is also incorporated herein by reference. If a composite tube with a metallic substrate is used, the end sections of the tube would be coated with metal rather than membrane material and the tube end directly welded to tube sheet 18.

Figure 3:
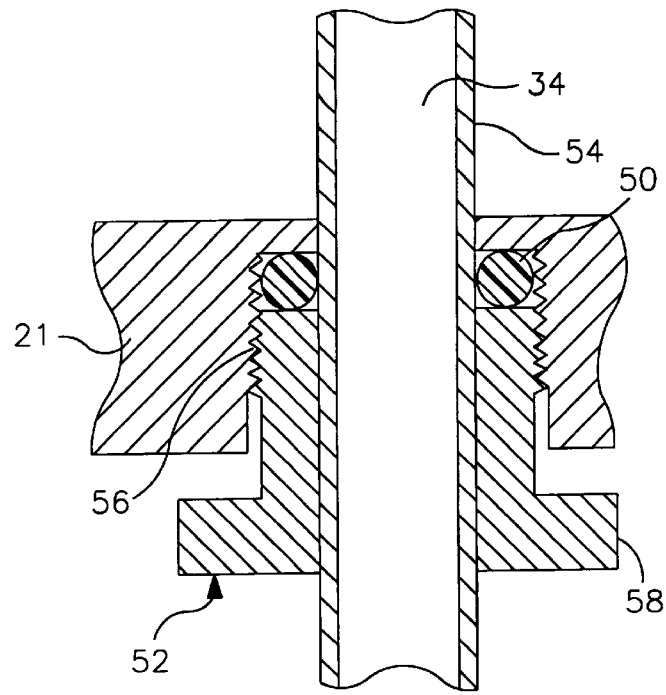
FIG. 3. illustrates in cross-sectional representation a slidable interface for use with the reactors of the invention.
Figure 4:
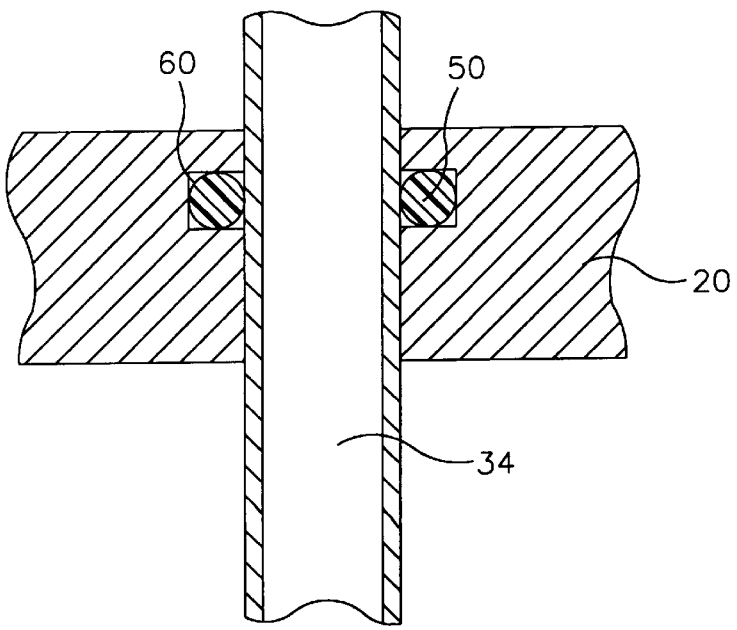
FIG. 4. illustrates in cross-sectional representation an alternative slidable interface.

With reference back to FIG. 1, the reaction tubes 34 extend through the first flow restricting tube sheet 24 and the second tube sheet 21. To compensate for changes in the axial dimension of the reaction tubes 34 due to temperature and compositional changes, sliding seals 48 and 50 seal the reaction tubes 34 to the tube sheets 21 and 24. FIGS. 3 and 4 illustrate exemplary sliding seals.

With reference to FIG. 3, an O-ring seal 50, or alternatively, one or more wraps or rings of a braided or twisted rope seal, is inserted in a blind hole formed in tube sheet 21. A sleeve 52 compressibly engages the O-ring 50 against outer walls 54 of reaction tube 34 to slidably seal tube 34 relative to tube sheet 21 and sleeve 52. Interengaging threads 56 may be utilized to apply the compressive force or, alternatively, sleeve flange 58 may be compressively loaded against a reactor component (not shown) or secured to sheet 21 by bolts.

Alternatively, as shown in FIG. 4, the O-ring 50 is installed in a properly dimensioned groove 60 in tube sheet 21. The seal between tube sheet 21 and the reaction tube 34 is accomplished by precompression of the O-ring 50 resulting from interference between the O-ring inner diameter and the reaction tube outer wall 54 diameter.

The seal areas preferably are maintained at moderate temperatures of between about 250° C. and 650° C. These relatively low temperatures, and the requirement that the sliding seals have to seal only against a small pressure differential and the fact that moderate leak rates can be tolerated by the process of the invention creates considerable degrees of freedom in seal selection.

Suitable sliding sealed O-rings for seals 48 and 50 include braided ceramic fibers as more fully described in U.S. Pat. No. 5,082,293 by Steinetz et al. that is incorporated by reference in its entirety herein, steel pressure rings, expanded graphite seals, compressed Grafoil rope packing (GRAFOIL is a trademark of UCAR International), high temperature elastomers and fluorocarbon materials.

Referring back to FIG. 1, the reactor 10 further includes a catalyst bed 62 supported by a porous screen 64 about reaction section 65 of the oxygen selective ion transport membrane element. The catalyst may consist of beads or alternately be mounted on a ceramic monolith structure. The catalyst contained within catalyst bed 62 is effective to enhance steam reforming of methane to syngas, such as nickel supported on alumina. The catalyst may be loaded for uniform activity throughout the catalyst bed 62, or, as described below, is preferably configured to provide a neutral balance between endothermic and exothermic reactions in the middle portion of the bed and slightly exothermic balances near the periphery or ends of catalyst bed 62. Ports 66 are provided for removal of spent catalyst and replacement with fresh material.

To increase reactor safety, a first buffer gas 90, also referred to herein as a second process gas, is introduced into the reactor 10 through a first buffer gas inlet 72 disposed between the first process gas inlet 26 and the first tube sheet 18. The first buffer gas 90 is selected to be a non-flammable, non-hazardous, contributor to the chemical reactions occurring within the reactor. While either carbon dioxide or steam may be employed, steam is preferred since it can be easily generated at the required pressure and is necessary for most reforming applications. The steam that is introduced through the first buffer gas inlet 72 is at a pressure that is slightly higher than the pressure under which the fuel gas is introduced through process gas inlet 26. Typically, the pressure differential between steam and the process gas will be between 1 psig and 20 psig, more preferably between 1 psig and 10 psig. The steam serves as a buffer for the slidable seals 48.

Since the pressure differential across the seal is much less than if the differential were between process gas pressure and atmospheric pressure, the service demands on the seal are modest. Further, since the higher pressure is on an exterior side, any leakage about the O-ring will simply admit additional steam into the reactor and the potentially hazardous leakage of process or product gas into oxygen containing spaces or out of the reactor is avoided. Substantial leaks about seals 48 can be tolerated since steam is also required by the reforming process. In other words, a dual stage seal preferably is established by the fixed, substantially hermetic seal of first end 36 to tube sheet 18 and slidable seal 48 in tube sheet 24, with the separation (chamber 19) therebetween receiving buffer gas 90 through inlet 72.

A quantity of steam is provided to the catalyst bed 62 for the steam reforming reaction. Steam enters the reaction zone and catalyst bed 62 through flow restricting orifices 74 which are dimensioned to provide a pressure drop of 1 to 10 psi at the prevailing required steam volumes. Since the rate of the reforming reaction, and therefore the heat required for reforming, is dependent upon the volume of steam available, the thermal balance of the reactor 10 may be adjusted by varying the quantity and pressure of steam introduced through the first buffer gas inlet 72.

A second buffer gas inlet 76 is preferably disposed between the oxygen containing gas inlet 30 and the second tube sheet 21. The function of the second buffer gas, also preferably steam is similar to that of the first buffer gas described above. The second buffer gas is introduced to the reactor 10 through the second buffer gas inlet 76 at a pressure that is slightly greater than the pressure of the product gas being removed through product gas outlet 70.

Typically, the pressure differential between the product gas and the second buffer gas is from about 1 psig to about 20 psig. The second buffer gas reduces the pressure differential applied to the sliding seals 50 between the second tube sheet 21 and reaction tube 34 and also reduces the risk of product gas leaking into the oxygen-containing gas manifold space 22 or the environment through the seal connecting inlet 30.

When the reactor 10 is operated, an oxygen-containing gas 38 flows in a first direction, as represented by flow arrows 77, through the oxygen-containing gas inlet 30. A manifold 22 formed in part by floating tube sheet 28 and head 80 directs the oxygen-containing gas 30 into at least one, and preferably a plurality, of reaction tubes 34.

At the oxygen selective ion transport membrane element 40, the oxygen-containing gas flows along the cathode side 82. A permeate portion 84 of the oxygen contained within the oxygen-containing gas 38 is transported to the anode side 86. A remaining retentate portion of the oxygen is discharged as oxygen-depleted gas 87.

A first process gas 88 is delivered to the reactor 10 through the process gas inlet 26 and a second process gas is delivered to the reactor 10 through the buffer gas port 72. The first process gas is selected to be capable of both an exothermic reaction with oxygen and an endothermic reaction with the second process gas. For the production of syngas as product gas 71, the first process gas preferably is selected from the group consisting of natural gas, methane, light hydrocarbons, as well as mixtures thereof. Some hydrogen and carbon monoxide may also be present, especially if some product gas is recycled through a portion of the reactor. An embodiment involving low grade fuel as the first process gas is described below for FIG. 10. The second process gas preferably is selected from the group consisting of steam, carbon dioxide, and mixtures thereof. The exothermic reaction is oxidation or partial oxidation and the endothermic reaction is steam reforming.

For the second process gas 90 to properly function as a buffer between the first process gas 88 and the oxygen containing space 20, the pressure of the second process gas 90 is greater than the pressure of the first process gas 88. To ease the requirements placed on sliding seal 24 the pressure differential is preferably from about 1 to about 20 psig. The desired pressure differential may be maintained by controlling the incoming pressure of the second process gas 90 and by controlling the dimensions of flow restricting orifices 74.

The second process gas 90 flows through the flow-restricting orifices 74 and mixes with the first process gas 88 forming a gaseous mixture that traverses the baffles 92 and is recuperatively heated by oxygen-depleted air 87 flowing through section 39. The baffles 92 preferably are disposed substantially perpendicular to reaction tubes 34, with an annular gap to slidably receive each tube 34, and are effective to direct shell-side gases against an outer surface of the heat transfer section to enhance thermal transfer. Preferably, baffles are also employed to direct gases against an outside surface of the reaction section to enhance uniform contact between the shell-side gases and the reforming catalyst.

The pre-heated gaseous mixture enters catalyst bed 62 where a portion of the first process gas 88 reacts with steam in a steam reforming reaction. Another portion of the first process gas 88 reacts with the permeate oxygen portion 84 in an oxidation reaction, preferably a partial oxidation reaction. The steam reforming reaction is endothermic and the partial oxidation reaction is exothermic. These two reactions are regulated by controlling the flow rate of the two process gases as well as by control of the flow rate of the oxygen containing gas delivered to the reactor. The internal heat balance of the reactor 10 may also be controlled, such as by separating the partial oxidation and reforming reactions by the use of thermally conductive shrouds as described below. Control of at least one of the exothermic reaction, the endothermic reaction, and the internal heat transfer of the reactor is used to maintain the oxygen selective ion transport membrane temperature at a temperature within prescribed thermal limits. Preferably, the temperature is maintained between 700° C. and 1050° C. The amount of heat generated by the exothermic reaction may be balanced with the amount of heat required by the endothermic reaction or, more preferably, the reactions are tailored to generate a slight heat surplus.

A portion of the heat surplus is used to provide heat to the oxygen-containing air 38. An additional portion is used to provide heat to the incoming process gases 88 and 72. The remainder of the surplus heat is used to compensate for heat leak to the reactor environment. The heat added to the incoming streams permits maintaining adequate temperature differences for effective heat transfer between leaving hot streams and entering cold streams. The spacings of baffles 92 and 93 on the shell side and the internal tube dimensions are selected to yield adequate convective heat transfer coefficients for recuperative heat transfer in heating zone 91 and cooling zone 96.

A number of means are available to control the endothermic and exothermic reactions. The endothermic reaction will be affected by steam and $CO_2$ content relative to fuel content, by local reactants and reaction products partial pressures, catalyst activity, local temperature and, to a minor extent, pressure. The exothermic reaction will be affected by the local fuel partial pressure and fuel species as well as by the oxygen containing gas pressure and flow rate and local membrane temperature. To increase the local endothermic reaction rate additional steam may be directly injected into selected portions of the reactor 10, such as into a central portion of the catalyst bed 62. Alternatively, or in combination with additional steam, the catalytic activity of the catalyst bed 62 may be graded, portions of the bed having a higher rate of reactivity to favor the endothermic steam reforming reaction. Typically catalyst activity should be low at the entrance to the reaction section, where the high driving force, in the form of high reactant and low reaction products partial pressures, favor endothermic reactions and thereafter increase, preferably at a decreasing rate, toward the center and the other, exit end of the bed as the driving force for the reaction declines. Incorporating internal means for heating entering streams, such as through section 39, and cooling exiting streams such as through section 41, eliminates the need for costly additional high temperature heat exchangers.

While the FIG. 1 illustrates an axial counter flow of gases through the catalyst bed 62, cross-counterflow may be achieved by baffles (not shown) provided within the catalyst bed 62 to promote mixing and mitigate the effects from flow maldistribution and nonuniform oxygen transport rates between individual tubes.

Typically, the first and second process gases will be delivered to the reactor at a temperature of between about 200° C. and 500° C. and the oxygen containing gas at a temperature of between about 150° C. and 400° C. This enables the sliding seals 48 to be maintained at a relatively moderate temperature of between about 250° C. and 650° C.

With counter-current flow of process gases and oxygen containing gas, it is possible to reduce the temperature of the exiting streams to the range of between about 300° C. and 700° C. again easing seal 50 selection as well material selection for pressure containing vessel sections such as tube sheets and heads which now operate in a more moderate temperature environment.

The gas delivered through the second buffer gas inlet 76 is preferably also steam or carbon dioxide, serving as some additional second process gas, and preferably at a pressure greater than the pressure of the product gas 71. Preferably, this pressure differential is between 1 psig and 20 psig. Alternatively, nitrogen, or another inert gas, may be delivered through the second buffer gas inlet 76. In this instance, the pressure of the second buffer gas is less than the pressure of the product gas. Preferably, the pressure differential is again between 1 and 20 psig. Reducing the pressure of the second buffer gas, when it is not a constituent of the reaction, prevents contamination of the reactor with the buffer gas, but still reduces the severity of the duty for the sliding seals 48.

An alternative reactor 100 is illustrated in FIG. 5. A number of the elements of the reactor 100 are analogous to components of the reactor 10 described above. These analogous components are given like reference numerals and the description above is intended to be incorporated herein.

Reactor 100 includes one or more reaction tubes 34 that are open at a first end 102 and closed at a second end 104. The oxygen-containing gas 38, that is preferably air, is delivered to the reactor through oxygen-containing gas inlet 30. The oxygen containing gas 38 flows into a feed tube 106 that is surrounded by reaction tube 34. The oxygen containing gas 38 flows from a first end 108 to a second end 110 of the feed tube 106. The second end 110 is spaced from the closed end 104 of the reaction tube 34 such that the oxygen containing gas 38 flows into a first annulus 112 that is defined by an outside surface 113 of the feed tube 106 and an inside surface cathode side 82) of the reaction tube 34.

Preferably, the inside diameter of feed tube 106 is at least twice the width of the first annulus 112. This spacing minimizes the relative transfer of heat flowing from the gases in the first annulus to the gases flowing inside the feed tube. For example, the feed tube inside diameter could be on the order of one-half inch, the first annulus width on the order of one-sixteenth inch and, taking into consideration wall width thicknesses of the feed and reaction tubes, the outside diameter of the reaction tube is preferably on the order of from three-fourth inch to seven eighths inch. The gas flow in the feed tube 106 and the first annulus are typically laminar or in the laminar to turbulent transition regime. In laminar flow, the convective film coefficients are inversely proportional to the hydraulic diameters which are the inner diameter of the feed tube and roughly twice the clearance of the first annulus. It can be shown that for the above conditions the ratio of film coefficients for heat transfer from air to process gases flowing in the annulus 112 to that for heat transfer from air in the annulus to air in the feed tube is preferably about 5 to 10, more preferably about 8.

As with the preceding embodiment, a permeate portion 84 of the oxygen contained within the oxygen containing gas 38 is transported through the oxygen selective ion transport membrane 40 to anode side 86 and is utilized in the exothermic partial oxidation reaction. The retentate portion 87 is discharged through air outlet 68. The feed tubes 106 are fixedly attached to a first tube sheet 114 and the open ends of the reaction tube 34 are fixedly attached to a second tube sheet 116. A third tube sheet 118 includes a sliding seal 48 between reaction tubes 34 and tube sheet 118 and also contains flow restricting orifices 74.

A first process gas 88, preferably natural gas, is introduced to the reactor 100 through process gas inlet 26. A second process gas 90, preferably steam, is introduced to the reactor between tube sheets 118 and 116. The second process gas 90 is at a pressure that is greater than the pressure of the first process gas 88 reducing the risk of a flammable first process gas leaking into an oxygen gas containing stream. Preferably, the pressure differential is relatively small, between 1 and 20 psig, to minimize the service demands on seal 48.

The second process gas 90 flows through flow restricting orifices 74 and is combined with first process gas 88. The gaseous mixture passes through first baffles 92 and into catalyst bed 62 where a portion of the process gas catalytically reacts with the steam in an endothermic reforming reaction while a major portion of the remainder of the process gas reacts exothermically with the permeate oxygen portion 84. A product gas 71 is recovered through product gas outlet 70.

The reactor 100 has a number of advantages when compared to the reactor 10 of FIG. 1. The reactor 100 requires one less tube sheet and one less set of sliding seals. The retained sliding seals 48 can be very loose since they function more as a flow restrictor than as barriers or isolation seals, the process flow of buffer gas (steam) being in the same direction as that of leakage flow. The closed end 104 of reaction tube 34 is not restrained and thereby avoids possible bending stresses from misalignment and axial forces due to friction. A disadvantage of the reactor 100 when compared to the reactor 10 is that cooling of the product gas 70 is less efficient due to the oxygen containing gas 38 having been slightly warmed while traversing the inside diameter of the feed tube 106. This results in the product gas being slightly warmer and the oxygen-depleted air 94 being slightly cooler when exiting the reactor 100 when compared to the streams exiting the syngas reactor 10.

A common feature of the reactor 10, FIG. 1, and the reactor 100, FIG. 5, is that the reactants and the reaction products of the exothermic reaction and the endothermic reaction are mixed. While this arrangement optimizes the transfer of heat from the exothermic reaction to the endothermic reaction, it could make control and balancing of the two reactions somewhat difficult. This difficulty is relieved by separating the endothermic reaction space from the exothermic reaction space while maintaining good heat transfer coupling.

Figure 6:
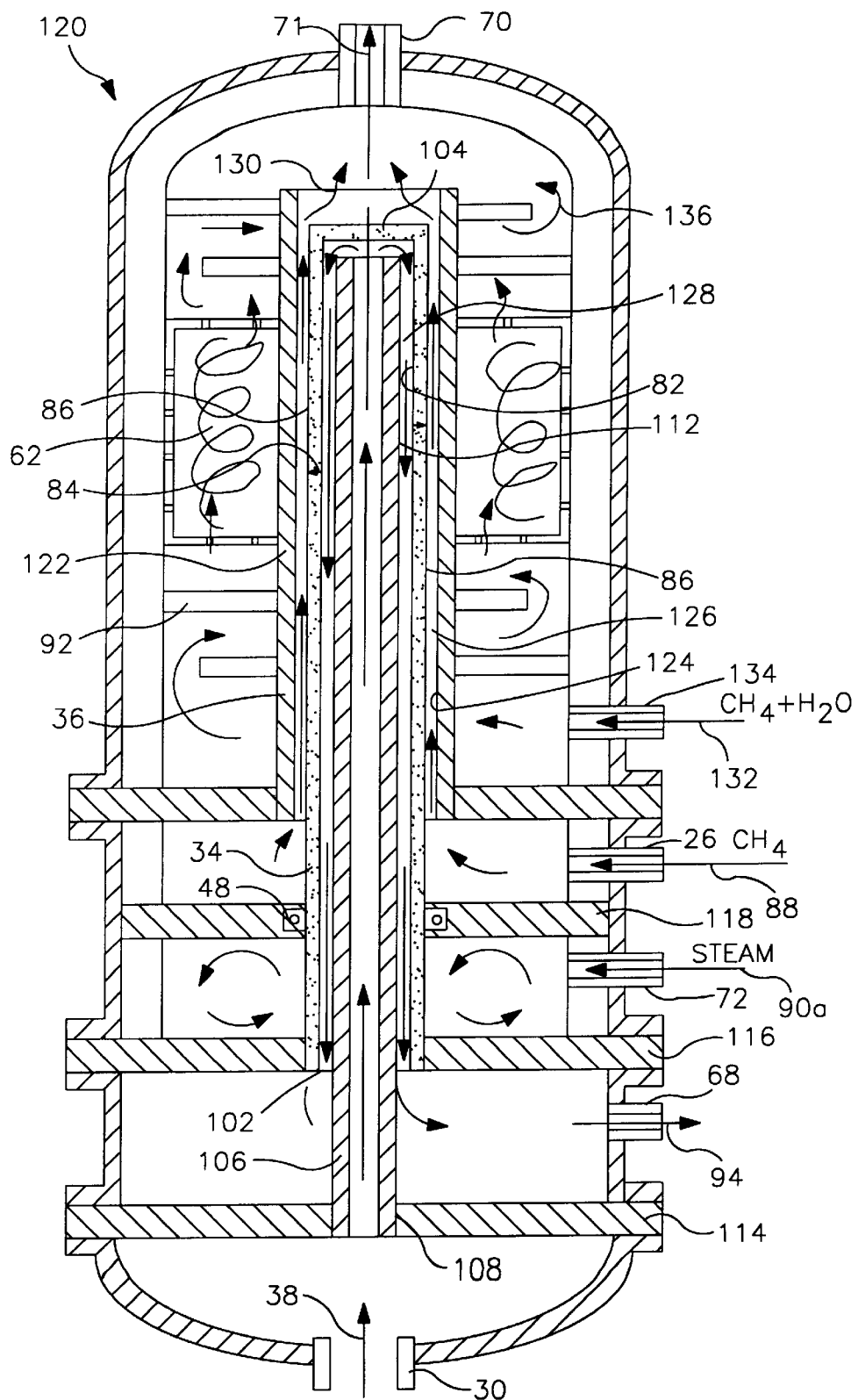
FIG. 6 illustrates in cross-sectional representation a reactor in accordance with a third embodiment of the invention.

This separation is achieved, in one embodiment of the invention, by use of the reactor 120 illustrated in cross sectional representation in FIG. 6. An oxygen containing gas 38, preferably air, is delivered to the reactor 120 through the oxygen-containing gas inlet 30. The oxygen containing gas 38 is delivered to a first end 108 of feed gas tube 106. While FIG. 6 illustrates a single feed gas tube in arrangement with other tubes such as described in FIGS. 7–10 below, multiple feed gas tubes likewise arranged with other tubes are typically incorporated within the same reactor. The first end 108 is fixedly attached to first tube sheet 114. A reaction tube 34 surrounds the feed tube 106. The reaction tube 34 has an open end 102 fixedly attached to second tube sheet 116, and closed end 104 and extends through third tube sheet 118 with a sliding seal 48 between tube 34 and tube sheet 118.

A shroud tube 122 surrounds at least that portion of reaction tube 34 disposed within catalyst bed 62. The shroud tube 122 is formed from a thermally conductive, gas impervious material, such as stainless steel, Inconel 200, or a suitable ceramic. The inside wall 124 of the shroud tube 122 and an outer (anode) wall 86 of the reaction tube 34 define a second annulus 126.

In operation, oxygen-containing gas 38 flows, in a first direction, through feed tube 106. At closed end 104 of reaction tube 34, the gas continues flowing through the first annulus 112 defined by the outside surface 113 of the feed tube 106 and the cathode side 82 of the reaction tube 34. Permeate portion 84 is transported to anode side 86 and oxygen-depleted air is discharged through air outlet 68.

A first process gas 88, that as described above may be natural gas, methane or other light hydrocarbon, is delivered to the reactor 120 through a first process gas inlet 26. A buffer gas 90*a*, such as steam, is delivered through buffer gas inlet 72. As described above, the steam is preferably at a pressure greater than the pressure of the first process gas and more preferably, the pressure differential is between 1 and 20 psig.

Distinguishing preceding embodiments, the steam 90*a* functions as a buffer only. The first process gas 88 flows through second annulus 126 and exothermically reacts with the permeate oxygen portion 84 generating a first reacted gas portion 130, that is typically syngas having a hydrogen-to-carbon monoxide ratio of 2.

A gaseous mixture 132 of process gas and steam is introduced to the reactor through second process gas inlet 134. Disposed between the first process gas inlet 26 and second process gas inlet 134 is a gas impenetrable barrier, preferably a fourth tube sheet 129. The gaseous mixture 132, that may optionally include carbon dioxide and recycled product is recuperatively heated by heat transfer from oxygen containing retentate gas flowing in annulus 128. Steam reforming then occurs in the catalyst bed 62 generating a second reacted gas portion 136 of a higher hydrogen to carbon monoxide ratio than first product stream 130. The second reacted gas portion 136 is combined with the first reacted gas portion 130 for the recovery of syngas 71 through product gas outlet 70.

The reactor 120 illustrated in FIG. 6 provides considerable flexibility in control of respective reactions as well as in adjusting product composition. The partial oxidation reaction and the reforming reaction are physically separated, while maintaining close heat transfer coupling between the two reactions. This permits independent and better control of the reactions. Additional advantages of separating the reactions include the possibility of driving the oxidation reactions beyond partial oxidation to provide the necessary heat for generating higher $H_2/CO$ ratios without sacrificing temperature control of the oxygen-transport membrane and without excessive NOx generation since nitrogen is excluded from the reaction side, and preferably all fluid streams are maintained at temperatures below 1100° C.

FIGS. 7 through 10 illustrate different gaseous flow arrangements for use with the reactor 120 of FIG. 6. In each embodiment there is an oxidation passage, one wall of which is the anode side 86 of the oxygen-selective transport membrane 34*a* and the other wall of which is a feed tube 106*a*. Oxidation reactions occur on the anode surface and the resulting heat of reaction provides the energy required by the endothermic reaction of steam reforming in catalyst bed 62. If the overall thermal balance is exothermic, the temperature rise of the oxygen containing gas and process streams flowing along reaction tube 34 is increased requiring these streams to enter at a lower temperature to maintain the required operating temperatures for the membrane elements.

Figure 7:
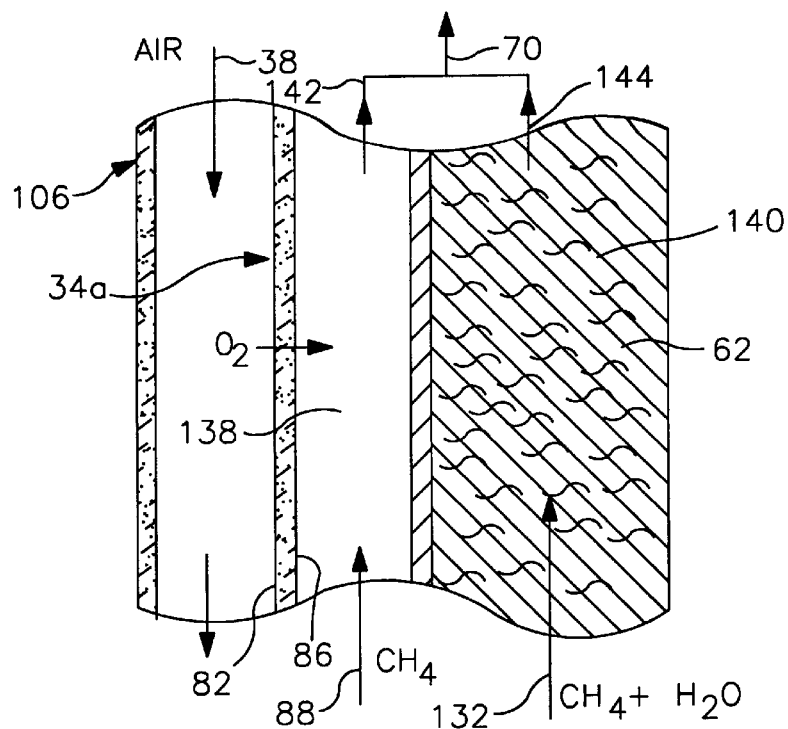
FIGS. 7–10 schematically illustrate different gaseous flow patterns useful with the reactor of FIG. 6.

With reference to FIG. 7, the oxygen containing gas 38 flows in a first direction. The first process gas 88 in oxidation passageway 138, corresponding to passageway 128, FIG. 6, and gaseous mixture 132 flowing through reforming passageway 140, through bed 62, flow in an opposite direction. The first exiting flow 142 from the oxidation passageway 138 typically has a $H_2/CO$ ratio of around 2 and the second exiting flow 144 from the reforming passageway 140 has a $H_2/CO$ ratio of about 3 or higher. By proportioning the respective feeds 88, 132 to the two parallel passages 138, 140, desired $H_2/CO$ ratios between 2 and 3 are obtained by mixing the two exiting streams 142, 144. At ratios less than about 2.4, the overall energy balance is typically exothermic and sensible temperature rise of the oxygen containing gas 38 and the process gases 88, 132 functions as a heat sink. At higher $H_2/CO$ ratios, the balance is endothermic and additional heat is required. The additional heat may be generated by letting the oxidation reaction progress somewhat beyond partial oxidation, such as by the addition of more oxygen, by introducing the oxygen containing and process gases at a higher temperature, or by combusting some fuel within the air passage.

Figure 8:
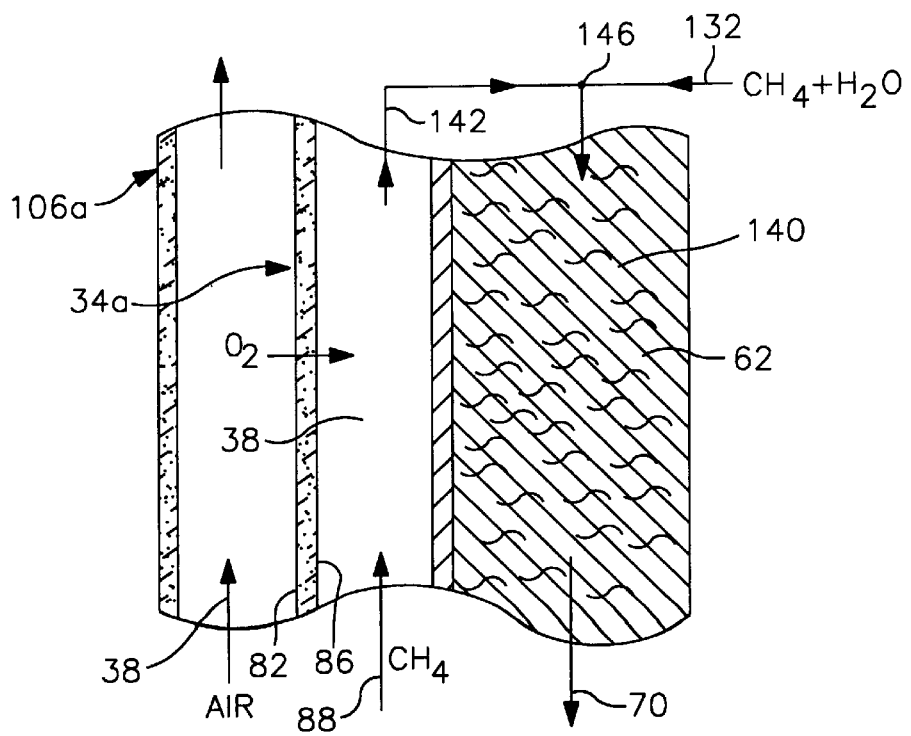

FIG. 8 illustrates a series arrangement for oxidation passageway 138 and reforming passageway 140. First process gas 88 is delivered to the oxidation passageway 138 and, following exothermic reaction with permeate oxygen, the first exiting stream 142 contains partial and complete oxidation products, dependent upon the fuel to oxygen ratio. The first exiting stream 142 is then mixed at junction 146 with a gaseous mixture 132 of first process gas and steam and delivered to reforming passageway 140. Different $H_2/CO$ ratios are obtained in product stream 70 by varying the ratio of the two process gas feed streams 88, 132 and the degree of complete oxidation in the oxidation passageway 138. In addition to providing the oxygen for the oxidation reaction, oxygen containing gas stream 78 constitutes a heat sink or heat source for balancing the energy requirements.

Figure 9:
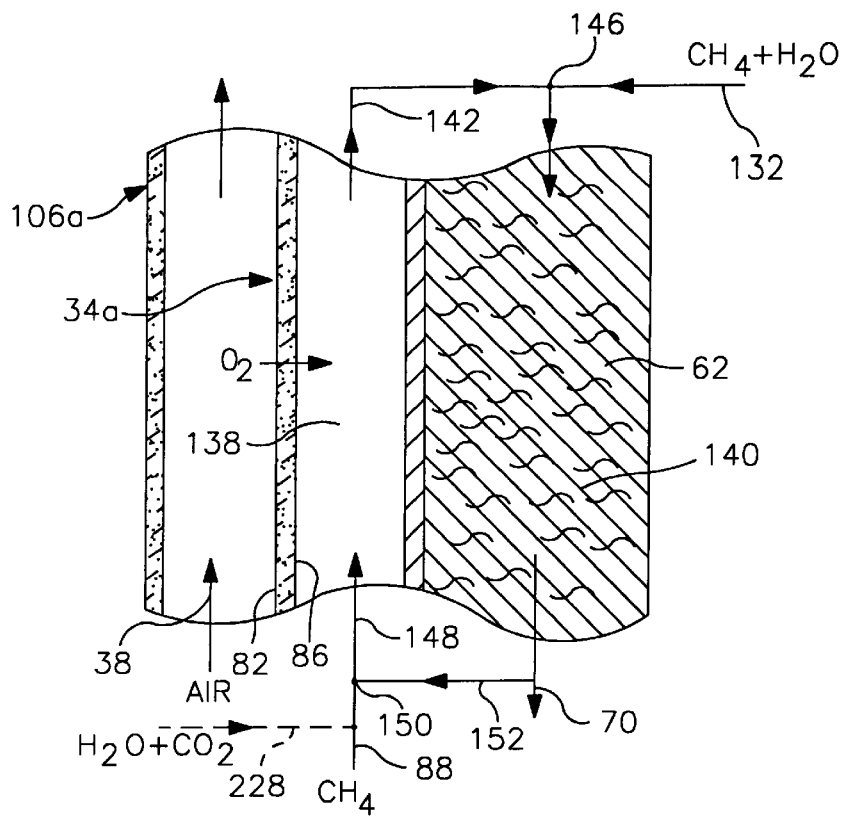

FIG. 9 illustrates an embodiment in which a product stream is recycled with the first process gas 88 to increase the oxygen flux and therefore heat generation, since the recycled product gas contains carbon monoxide and hydrogen and the reaction of these gases with the permeating oxygen is faster. This results in decreasing the anode side partial oxygen pressure and increasing the oxygen transport driving force. Oxygen flux depends on the rate of oxygen transport from the cathode side 82 to anode side 86 of reaction tube 34. Stream 148 is a mixture of first process gas 88 and a portion 152 of product gas 70 which are joined at junction 150.

Alternatively, the first process gas 88 may be diluted with carbon dioxide and steam (dashed line 228, FIG. 9) to decrease the oxygen flux. This is advantageous in embodiments where high oxygen fluxes generate excessive heat on the anode surface 86 making temperature control of the surface difficult.

Figure 10:
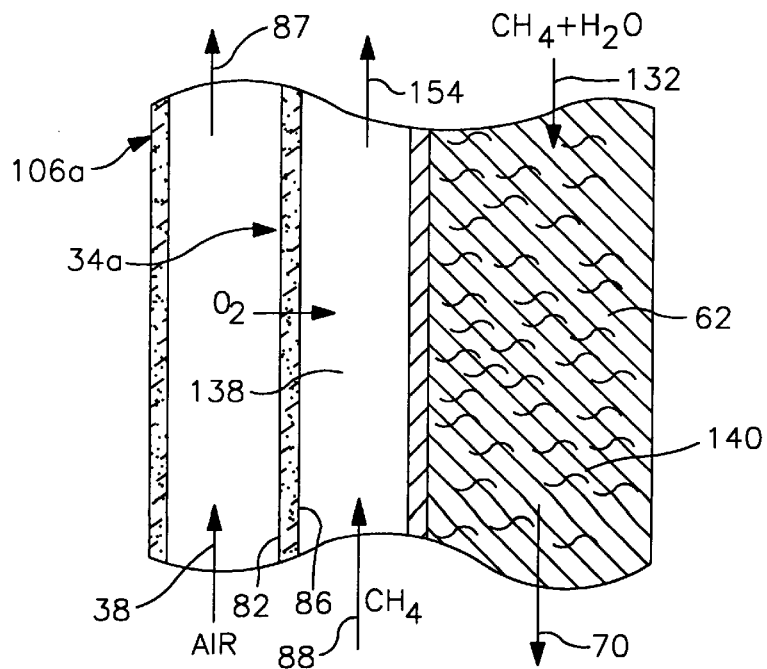

FIG. 10 illustrates a flow embodiment for a pure reformer where the energy for the reforming reaction is provided by a novel combuster. In this embodiment, gases from the oxidation passageway 138 do not communicate with gases in reformer passageway 140. The first process gas 88 is combusted with permeate oxygen to generate the heat required by the endothermic reforming reaction. Combustion products 154 are discharged from the reactor. Among the advantages of the oxygen selective ion transport membrane reformer illustrated in FIG. 10 are the option to use a low grade fuel at a low pressure, good control over surface temperatures of the oxygen transport membrane and reformer walls, and low NOx generation because nitrogen is excluded from the reaction environment and the temperature of the oxygen-depleted air 87 is typically less than 1000° C.) The term "low grade fuel" as used herein refers to a gas stream having a fuel value of less than 500 BTU per cubic foot. By comparison, natural gas typically has a fuel value of 900–1000 BTU/cf. One source of low grade fuel is pressure swing adsorption (PSA) tail gas typically containing less than fifty percent hydrocarbons or carbon monoxide, with the majority of the stream being carbon dioxide and/or water.

Figure 11:
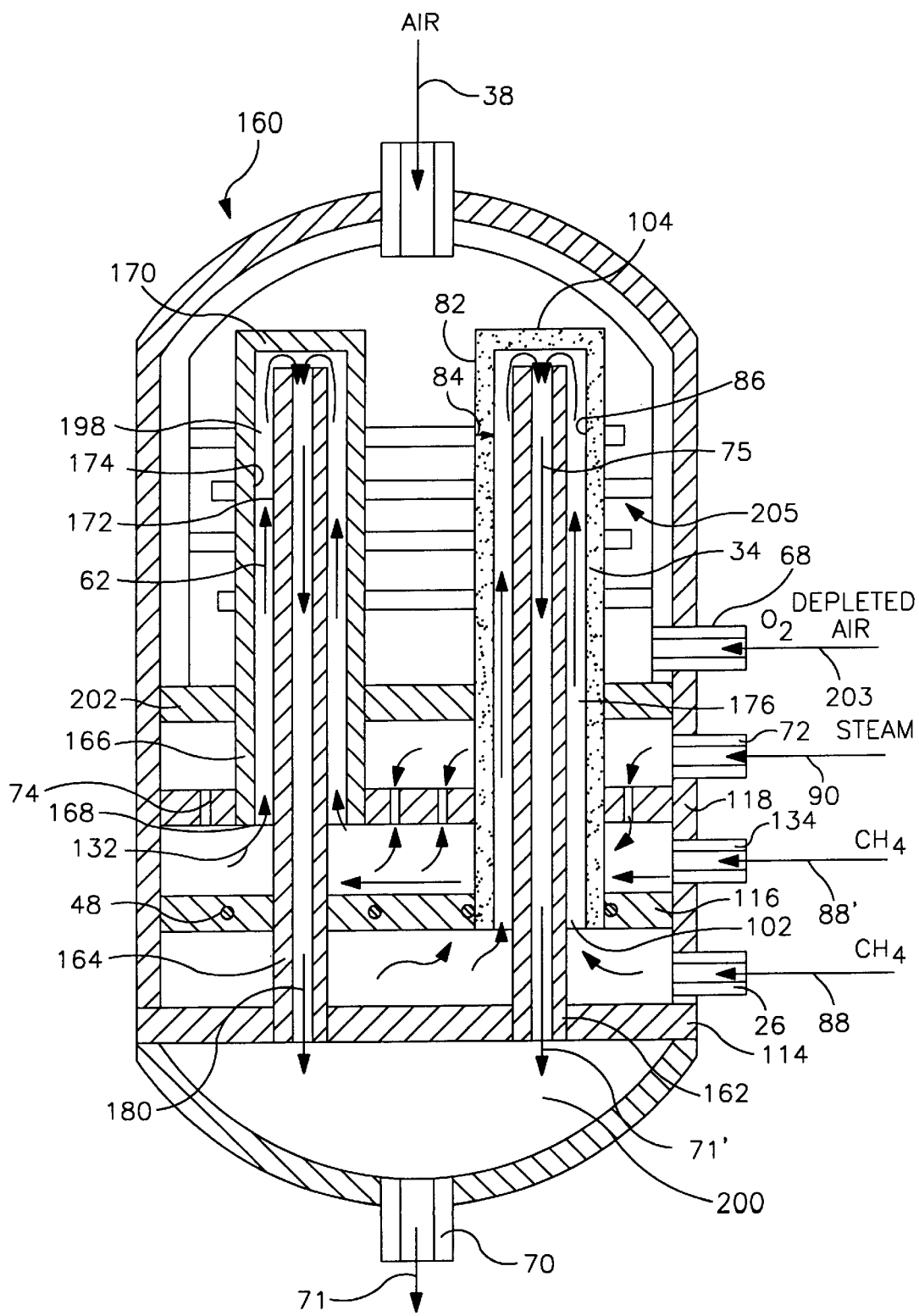
FIG. 11 illustrates in cross-sectional representation a reactor in accordance with a fourth embodiment of the invention.
Figure 12:
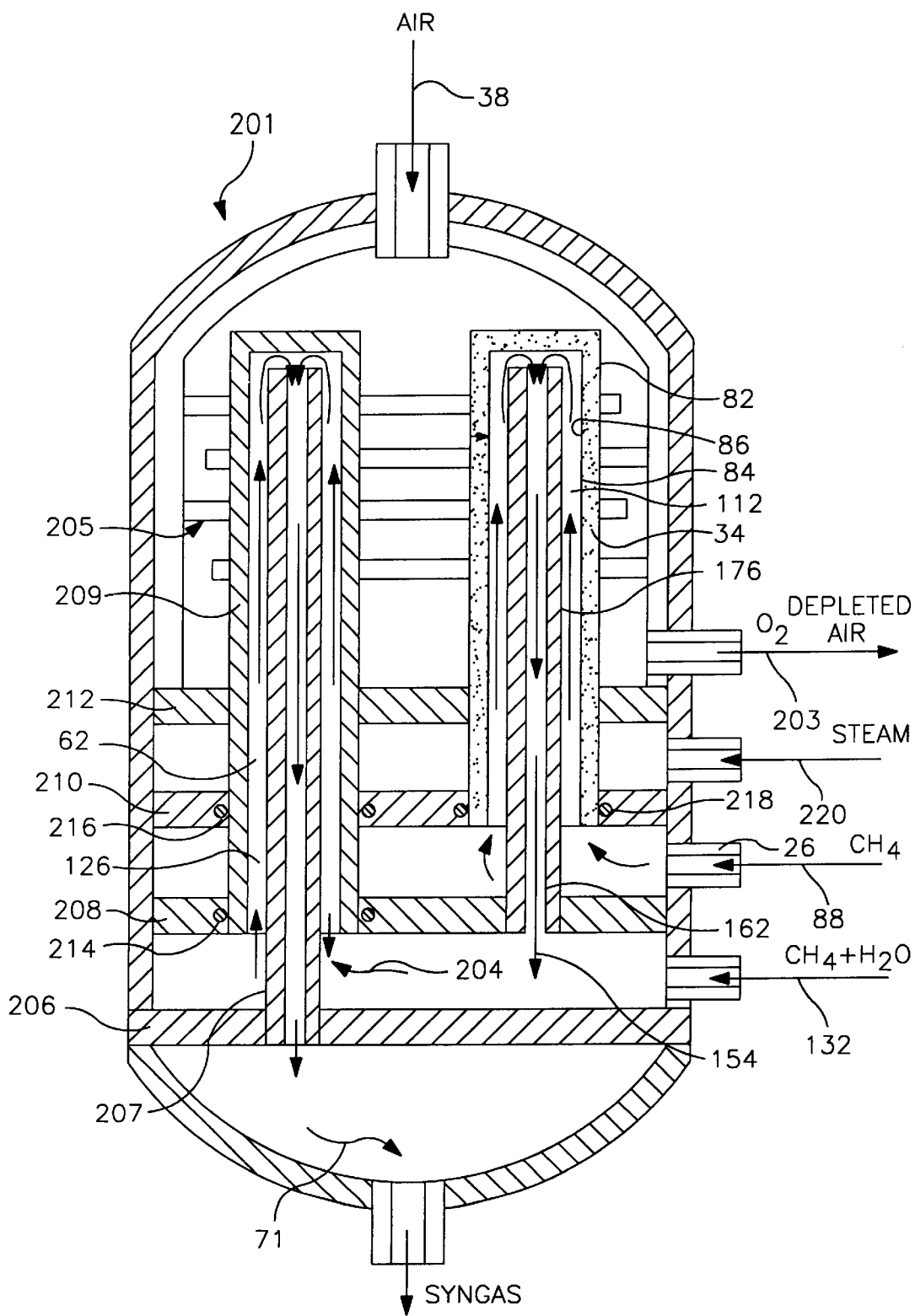
FIG. 12 illustrates in cross-sectional representation a reactor in accordance with a fifth embodiment of the invention.

FIGS. 11 and 12 illustrate alternative reactor embodiments where feed tubes are replaced with withdrawal tubes and the oxygen containing gas flows shell side about the outside surfaces of concentrically aligned tubes and process gases flow on the inside annulus of concentric tubes.

Reactor 160, FIG. 11, includes a first withdrawal tube 162 and a second withdrawal tube 164, both of which are fixedly attached to a first tube sheet 114. Disposed about the first withdrawal tube 162 is a reaction tube 34 having an open end 102 penetrating through a second tube sheet 116 with a sliding seal 48 between the tube and the tube sheet. The reaction tube 34 has an opposing closed end 104 and an oxygen transport membrane at least extending through the reacting section of the reactor.

Disposed about the second withdrawal tube 164 is a reformer tube 166 formed of a metal or ceramic material for containing a steam reformation reaction as described below. The reformer tube 166 has an open end 168 fixedly attached to a third tube sheet 118, or to fourth tube sheet 202, and has an opposing closed end 170. A catalyst bed 62 preferably fills an annulus 198 defined by an outside wall 172 of the second withdrawal tube 164 and an inner wall 174 of reformer tube 166.

When the reactor 160 is operated, an oxygen-containing gas 38, typically air, is delivered to the hermetic enclosure of the reactor. Oxygen contacts an outside (cathode) surface 82 of reaction tube 34 and permeate portion 84 is transported to the anode side 86. The combination of the anode side 86 and an outer wall 176 of the first withdrawal tube 162 forms an annulus where partial oxidation occurs.

A first process gas 88, typically natural gas, methane or other light hydrocarbon, is delivered to the reactor through first process gas inlet 26. The first process gas 88 flows through the annulus defined by the outer wall 176 and anode side 86. Partial oxidation occurs generating a product gas 71 that is removed through the first withdrawal tube 162 into chamber 200.

In parallel with the oxidation reaction, additional first process gas 88' is delivered through second process gas inlet 134 and combined with steam 90 introduced through buffer gas inlet 72. The steam is at a higher pressure than the additional first process gas 88' and flows through flow-restricting orifices 74 to combine with the additional first process gas 88' to form a gaseous mixture 132. Flowing upward through annulus 198, mixture 132 is preheated, participates in a reforming reaction in bed 62, and is then cooled by shellside air 38 before being withdrawn through tube 164. The gaseous mixture 132 is transported through catalyst bed 62 where steam reforming occurs generating a second product gas portion 180 that is combined with the first product gas portion 71 in chamber 200 and removed through the product gas outlet 70 as combined product stream 71.

As with earlier embodiments, pressurized steam 90 functions as a buffer between the additional first process gas 88' and the low pressure oxygen containing gas 38. Oxygen-depleted gas stream 203 is withdrawn from reactor 201 after traversing baffles 205.

Functionally the embodiment of the invention represented by FIG. 11 is similar to the arrangement of FIG. 7. The embodiment of FIG. 11 preferably also includes preheat and cooling sections.

FIG. 12 illustrates a reactor 201 in which the gaseous flow is in series. First process gas 88 enters the reactor through first process gas inlet 26. Steam, introduced between tube sheets 210 and 208 at a pressure slightly higher than that of process gas 88, acts as a buffer gas to prevent leakage of fuel into partially oxygen depleted gas 203. The first process gas flows 88 into the first annulus 112 that is defined by an inside (anode) surface 86 of reaction tube 34 and an outside surface 176 of first withdrawal tube 162.

An oxygen containing gas 38, such as air, is delivered to the hermetic enclosure of the reactor and contacts an outside (cathode side) side 82 of reaction tube 34. Permeate portion 84 of the oxygen is transported through the oxygen-selective ion transport membrane and an exothermic oxidation reaction occurs on the anode side surfaces 86. Oxygen-depleted gas stream 203 is withdrawn from reactor 201 after traversing baffles 205.

Oxidation products 154 are combined with gaseous mixture 132 of additional process gas (similar to process gas 88', FIG. 11) and steam 220 (similar to steam 90, FIG. 11) to form a combined process stream 204 which is delivered to the second annulus 126 that is packed with catalyst 62 between reformer tube 209 and withdrawal tube 207. Following steam reforming, product gas 71, such as syngas, is recovered. This embodiment is functionally similar to that of FIG. 8.

The configurations of FIGS. 11 and 12 have the air flow shell side and reactions taking place along the inner diameter of reaction tubes. Those skilled in the art will recognize that the processes of FIGS. 1, 5 and 6 can also be carried out with reactions inside tubes and air flowing outside tubes if all reaction tubes contain ion transport membranes at least in the reaction zone of an ion transport reactor. Designs similar to those represented by FIGS. 11 and 12 would be used.

Preferably, each tube is fixedly attached to only one tube sheet and is slidably sealed to other tube sheets, or passes freely therethrough. For example, withdrawal tube 207, FIG. 12, is attached only to tube sheet 206 and withdrawal tube 162 is attached only to tube sheet 208. Withdrawal tubes 207, 162 pass freely through the remaining tube sheets 210, 212 by being positioned inside of reformer tube 209 and reaction tube 34, respectively. Reformer tube 209 is fixedly attached in this construction to tube sheet 212 and is slidably sealed by seals 214, 216 through tube sheets 208, 210, respectively. Reaction tube 34 is fixedly attached only to tube sheet 212 and is slidably sealed by seal 218 in tube sheet 210. Tubes 209 and 34 pass freely through slight annular gaps in baffles 205.

The advantages of the integrated processes of the invention and reactor designs associated therewith, will become more apparent from the Example that follows:

EXAMPLE

A tube and shell reactor of the type illustrated in FIG. 1 was computer modeled. The reactor had 1,000 reaction tubes 34 with each reaction tube having a length of 31 feet. Of this length, the reaction section 65 had a length of 18 feet, the pre-heat section 91 had a length of 6 feet and the cooling section 96 had a length of 7 feet. The tube to tube pitch was 1.5" and the tube bundle diameter was 4 feet. Each tube was formed from a dense mixed conductor that was capable of selective ion transport in the reaction section 65 and was inactive outside the reaction section 65. The tubes had an outside diameter of 1 inch and an inside diameter of 0.875 inch. The membranes 40 in the reaction section 65 were formed from LaSrFeCr perovskite.

Figure 13:
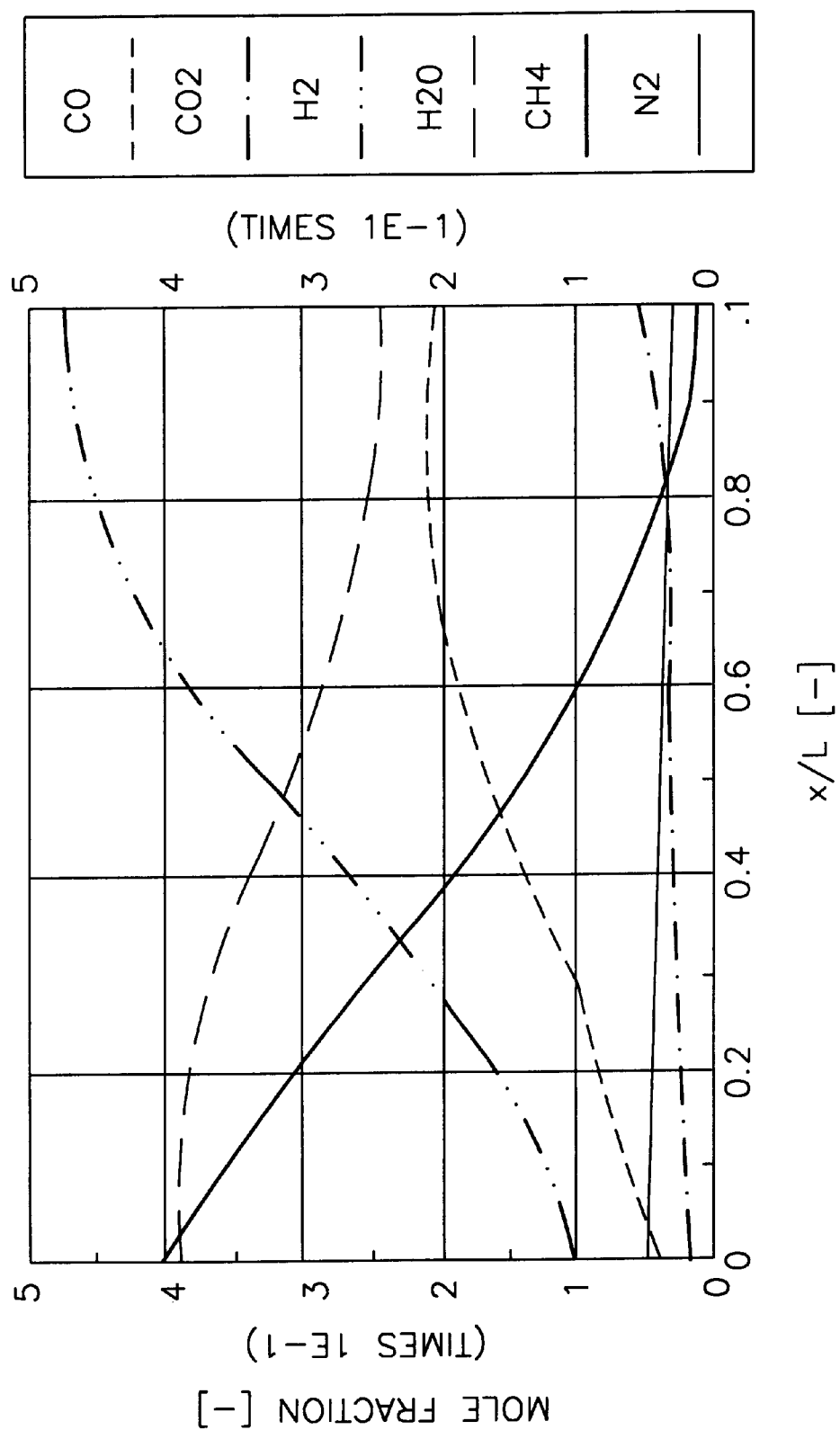
FIG. 13 graphically illustrates the predicted compositions of the process gases and the product gases over the length of the anode side of the reactor illustrated in FIG. 1.

FIG. 13 graphically illustrates the gaseous composition of the reactor. The horizontal axis represents the percent of the reaction section that has been traversed by the reaction constituents while the vertical axis identifies the molar percent of each constituent. When x/L=0, at the extreme upstream end of the reaction section next to pre-heat section 91, the gaseous constituents are approximately, in molar percent, 40% $CH_4$, 39% CO, 10% $H_2$, 8% CO and the balance $CO_2$. When x/L=1, the extreme downstream end of the reaction section adjacent to cooling section 96, the predicted gaseous constituent composition, in molar percent, is 47% $H_2$, 25% $H_2O$, 20% CO, 5% $CO_2$, 4% $N_2$ and 2% $CH_4$.

Figure 14:
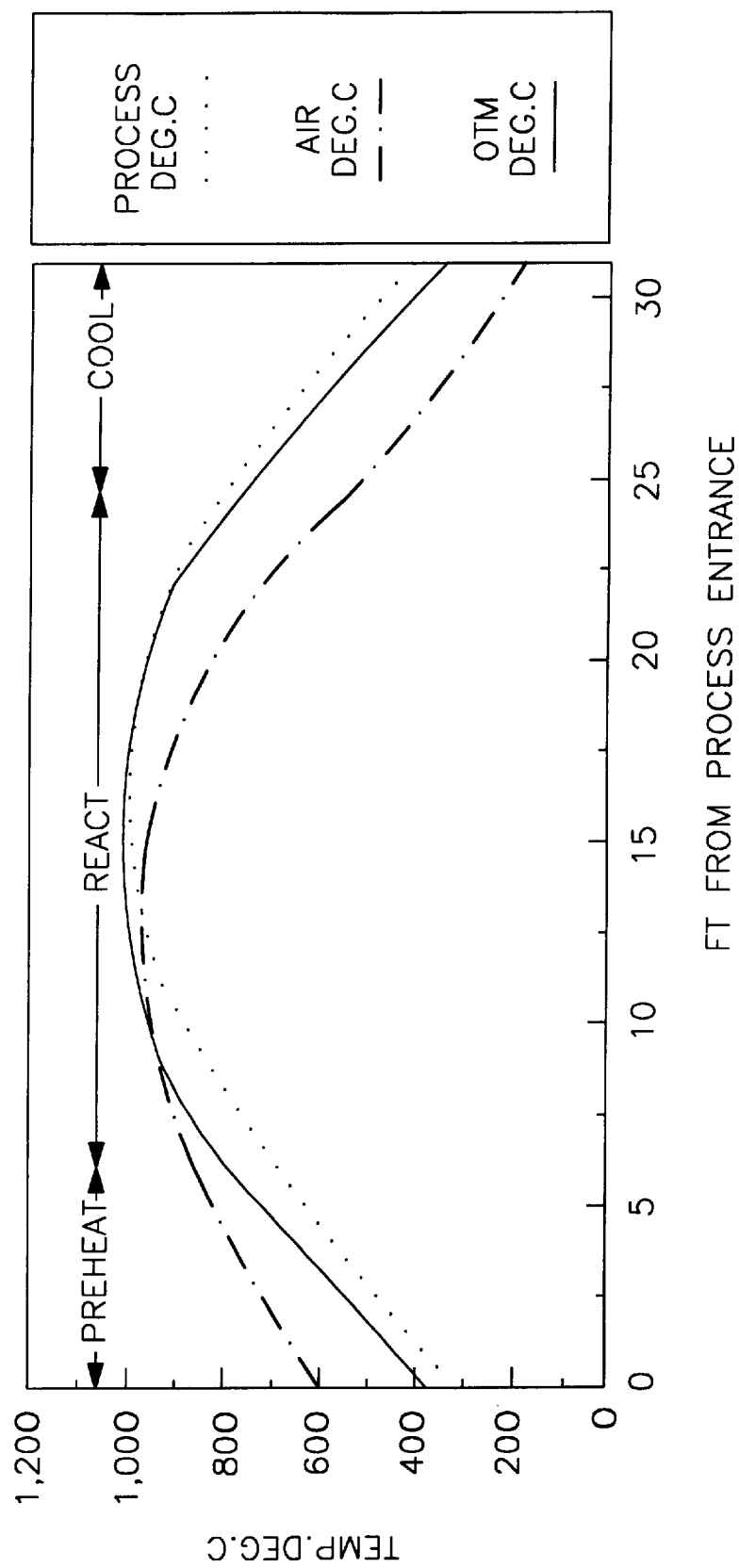
FIG. 14 graphically illustrates the predicted temperatures as a function of position along the length of a reaction tube in the reactor illustrated in FIG. 1.

It was determined that the average oxygen flux throughout the reaction section was 15.4 $NCFH/FT^2$ and 50% of the oxygen available in the feed air was utilized. The temperature over the entire length of the reaction tube is as illustrated in FIG. 14. The net production of hydrogen is predicted to be 495 pounds mol/hr and of carbon monoxide 211 pounds mol/hr for a molar ratio of $H_2:CO$=2.35.

The Example illustrates the ability to control heat generation and heat transfer to prevent excessive excursions of the oxygen selective ion transport membrane temperature and to achieve tube temperatures in the seal areas of less than 400° C. that substantially ease the restrictions placed on the sliding seals.

While the reactor has been particularly described as a tube and shell type reactor, it is recognized that other types of reactors suitable for the partial oxidation and reforming of gaseous constituents may be utilized in carrying out the processes of the invention.

It is recognized that the ion transport membranes utilized in the process of the invention may have any desired configuration, including tubes, plates and straight channels. In addition, oxygen flux rates may be enhanced through the incorporation of catalysts, surface coatings or porous layers with membranes.

The term "comprising" is used herein as meaning "including but not limited to", that is, as specifying the presence of stated features, integers, steps or components as referred to in the claims, but not precluding the presence or addition of one or more other features, integers, steps, components, or groups thereof.

Specific features of the invention are shown in one or more of the drawings for convenience only, as each feature may be combined with other features in accordance with the invention. Alternative embodiments will be recognized by those skilled in the art and intended to be included within the scope of the claims.

We claim:

1. A reactor comprising:

a hollow shell defining a hermetic enclosure;

a plurality of tube sheets disposed within said hermetic enclosure, a first one of said plurality of tube sheets defining a first chamber and a second chamber;

at least one reaction tube each having a first end and an opposing second end, said first end of each reaction tube being fixedly attached and substantially hermetically sealed to one of said plurality of tube sheets and opening into said first chamber, the second end of each reaction tube being axially unrestrained;

each of said reaction tubes is composed of an oxygen selective ion transport membrane with an anode side and a cathode side wherein said oxygen selective ion transport membrane is formed from a mixed conductor metal oxide that is effective for the transport of elemental oxygen at elevated temperatures;

each of said reaction tubes includes a first and second heat transfer sections and a reaction section, said reaction section disposed between said first and second heat transfer sections;

a reforming catalyst is disposed about the anode side of said oxygen selective ion transport membrane;

at least a portion of both said first heat transfer portion and of said second heat transfer portion are formed of metal;

a first process gas inlet for the delivery of a first process gas to said hermetic enclosure at a first pressure;

a second process gas inlet for the delivery of a second process gas to said hermetic enclosure at a second pressure;

an inlet for delivery of an oxygen containing gas to said hermetic enclosure at a third pressure; and, a plurality of outlets for the removal of a product gas and reaction by-product gases from said hermetic enclosure.

2. The reactor of claim 1 wherein each of said reaction tubes is formed from a porous metal support layer, a mid-portion of which is coated with an intermediate porous transition layer and a mixed conductor metal oxide effective for the transport of elemental oxygen at elevated temperatures and said first heat transfer section and said second heat transfer section are both coated with a dense metallic layer.

3. The reactor of claim 1 wherein said oxygen selective ion transport membrane has an oxidation enhancing catalyst selectively disposed on an anode side surface thereof and a reforming enhancing catalyst disposed about said anode side surface.

4. The reactor of claim 1 including a plurality of reaction tubes, wherein at least one seal slidably engages each said reaction tube at another one of said plurality of tube sheets.

5. The reactor of claim 1 wherein each said second end of each said reaction tubes is attached to a floating tube sheet, said floating tube sheet being integral with a floating manifold that is connected to said shell by one of a flexible bellows and stuffing box type sliding seal.

6. The reactor of claim 4 wherein each said second end of each said reaction tubes is attached to one of said tube sheets by a separate flexible bellows.

7. The reactor of claim 1 wherein a plurality of baffles are disposed substantially perpendicular to at least one of said reaction tubes and are effective to direct shell-side gases against an outside surface of one or both of said respective first and second heat transfer sections to enhance thermal transfer.

8. The reactor of claim 1 wherein a plurality of baffles are disposed substantially perpendicular to at least one of said reaction tubes and are effective to direct shell-side gases against an outside surface of said reaction section to enhance uniform contact between said shell-side gases and said reforming catalyst.

9. The reactor of claim 1 wherein said first end of each of said reaction tubes is open proximate a first tube sheet and said second end is closed; and a feed tube extends within said reaction tube from said open first end to a spaced distance from said closed second end whereby an outside surface of said feed tube and an inside surface of said reaction tube define a first tube annulus.

10. The reactor of claim 9 wherein said first tube annulus has a width that is less than one-half the inside diameter of said feed tube.

11. The reactor of claim 1 wherein a thermally conductive shroud tube is disposed about an outside surface of said reaction tube, a combination of said thermally conductive shroud tube and said reaction tube define an oxidation passageway, and a reforming passageway being disposed on an opposing side of said thermally conductive shroud.

12. The reactor of claim 11 wherein said reforming passageway is packed with a catalyst that is effective to promote an endothermic steam reforming reaction.

13. The reactor of claim 1 wherein a dual stage seal joins said first end of each of said reaction tubes to at least two of said plurality of tube sheets, said dual stage seal comprising a fixed attachment of said first end of each of said reaction tubes to one of said plurality of tube sheets and a slidable seal between each of said reaction tubes and a second of said plurality of tube sheets, a separation between said at least two of said plurality of tube sheets being for the reaction of a buffer gas.

14. The reactor of claim 1 wherein first and second reaction tubes extend generally in parallel through said hermetic enclosure, said first and second reaction tubes each have an open first end attached to one of said plurality of tube sheets and fixed relative to said shell and a closed opposing second end that is moveable relative to said shell, a first feed tube open on each end disposed within said first reaction tube creating a first annulus within said first feed tube and a second annulus between said first feed tube and said first reaction tube, and a second feed tube open on each end disposed within said second reaction tube creating a third annulus within said second feed tube and a fourth annulus between said second feed tube and said second reaction tube.

15. The reactor of claim 1 wherein said second process gas inlet is disposed between a first tube sheet and said first process gas inlet for delivery of a second process gas to said hermetic enclosure at a second pressure, said second pressure being greater than said first pressure.

16. The reaction of claim 1 wherein a first end of a first reaction tube is open proximate the first tube sheet and a second end is closed, and a first withdrawal tube extends within said first reaction tube from said open first end to a spaced distance from said closed second end whereby an outside surface of said first withdrawal tube and an inside surface of said first reaction tube define a first tube annulus;

a second reaction tube extends through said hermetic enclosure in generally parallel alignment with said first reaction tube, said second reaction tube having a first end attached to one of said plurality of tube sheets and fixed relative to said shell and an opposing second end that is moveable relative to said shell, said second reaction tube being open at a first end thereof with a second withdrawal tube, open at both ends, disposed within said second reaction tube and an outside surface of said second withdrawal tube and an inside surface of said first reaction tube define a second tube annulus; and, said first and second withdrawal tube open to a common space.

17. The reactor of claim 16 wherein said first end of said first reaction tube terminates at a second tube sheet and said second reaction tube extends to a third tube sheet and a third inlet is located between said second tube sheet and said third tube sheet for introduction of a mixture of said first and said second process gases, and said first withdrawal tube is fixedly attached to said third tube sheet and discharges into said third inlet for said mixture of said first and second process gases.

18. A reactor comprising:

a hollow shell defining a hermetic enclosure;

a plurality of tube sheets disposed within said hermetic enclosure, a first one of said plurality of tube sheets defining a first chamber and a second chamber;

at least one reaction tube each having a first end and an opposing second end, said first end of each reaction tube being fixedly attached and substantially hermetically sealed to one of said plurality of tube sheets and opening into said first chamber, the second end of each reaction tube being axially unrestrained;

each of said reaction tubes is composed of an oxygen selective ion transport membrane with an anode side and a cathode side wherein said oxygen selective ion transport membrane is formed from a mixed conductor metal oxide that is effective for the transport of elemental oxygen at elevated temperatures;

each of said reaction tubes includes a first and second heat transfer sections and a reaction section, said reaction section disposed between said first and second heat transfer sections;

a reforming catalyst is disposed about an anode side of said oxygen selective ion transport membrane;

at least a portion of both said first heat transfer portion and of said second heat transfer portion are formed of a ceramic material coated with a dense metallic layer;

a first process gas inlet for the delivery of a first process gas to said hermetic enclosure at a first pressure;

a second process gas inlet for the delivery of a second process gas to said hermetic enclosure at a second pressure;

an inlet for delivery of an oxygen containing gas to said hermetic enclosure at a third pressure; and, a plurality of outlets for the removal of a product gas and reaction by-product gases from said hermetic enclosure.

* * * * *